(12) United States Patent
Chen et al.

(10) Patent No.: US 9,497,027 B2
(45) Date of Patent: Nov. 15, 2016

(54) ENCRYPTION ENGINE WITH TWIN CELL MEMORY ARRAY

(71) Applicant: GLOBALFOUNDRIES INC., Grand Cayman (KY)

(72) Inventors: Xiang Chen, Brooklyn, NY (US); Derek H. Leu, Hopewell Junction, NY (US); Toshiaki Kirihata, Poughkeepsie, NY (US); Sami Rosenblatt, White Plains, NY (US)

(73) Assignee: GlobalFoundries, Inc., Grand Cayman (KY)

( * ) Notice: Subject to any disclaimer, the term of this patent is extended or adjusted under 35 U.S.C. 154(b) by 137 days.

(21) Appl. No.: 14/293,306

(22) Filed: Jun. 2, 2014

(65) Prior Publication Data

US 2015/0349967 A1 Dec. 3, 2015

(51) Int. Cl.
| | |
|---|---|
| *G06F 11/30* | (2006.01) |
| *H04L 9/32* | (2006.01) |
| *G11C 16/04* | (2006.01) |
| *G11C 17/16* | (2006.01) |
| *G06F 12/14* | (2006.01) |
| *G09C 1/00* | (2006.01) |
| *G11C 7/24* | (2006.01) |
| *G11C 11/56* | (2006.01) |

(52) U.S. Cl.
CPC .......... *H04L 9/3278* (2013.01); *G06F 12/1408* (2013.01); *G06F 12/1425* (2013.01); *G09C 1/00* (2013.01); *G11C 7/24* (2013.01); *G11C 11/5692* (2013.01); *G11C 16/0491* (2013.01); *G11C 17/16* (2013.01)

(58) Field of Classification Search
CPC .......... G06F 12/1408; G06F 12/1425; H04L 9/3278; H04L 9/3271; G11C 16/0491; G11C 11/5692

USPC .......................................... 713/193; 365/154
See application file for complete search history.

(56) References Cited

U.S. PATENT DOCUMENTS

| | | | |
|---|---|---|---|
| 2004/0059925 A1* | 3/2004 | Benhammou | G06F 12/1458 713/189 |
| 2012/0230087 A1* | 9/2012 | Chellappa | G11C 11/413 365/154 |
| 2013/0133031 A1* | 5/2013 | Fainstein | G06F 21/44 726/2 |
| 2013/0185562 A1* | 7/2013 | Kato | H04L 9/0816 713/171 |
| 2015/0163211 A1* | 6/2015 | Chellappa | H04L 63/08 713/155 |
| 2015/0278551 A1* | 10/2015 | Iyer | G06F 21/70 726/2 |

OTHER PUBLICATIONS

G. Edward Suh Cornell University, "Physical Unclonable Functions for Device Authentication and Secret Key Generation" 2007.*
"A Self-Authenticating Chip Architecture Using an Intrinsic Fingerprint of Embedded DRAM", Rosenblatt, et al. 2013 IEEE.
"Field Tolerant Dynamic Intrinsic Chip ID Using 32 nm High-K/ Metal Gate SOI Embedded DRAM", Rosenblatt, et al., 2013 IEEE.
"Improved Circuits for Microchip Identification Using SRAM Mismatch", Chellappa, et al., 2011 IEEE.

* cited by examiner

*Primary Examiner* — Samon Lemma
(74) *Attorney, Agent, or Firm* — Scully Scott Murphy and Presser; Frank Digliglio

(57) ABSTRACT

Described are a hardware encryption engine, and secret key registration and authentication system recoverable binary bit using knowing an initial secret key stored in the master system. The secret key is overwritten in each authentication, updating it to the master and encryption engine independently. The secret key over write command can be preferably given to the chip as a CHG, and the non recoverable binary bit from the sense amplifier is used for response.

8 Claims, 14 Drawing Sheets

ENCRYPTION ENGINE WITH TWIN CELL MEMORY ARRAY

FIELD OF THE INVENTION

The present disclosure relates to encryption and authentication methods for hardware security. More specifically, embodiments of the disclosure relate to an encryption method using a Multi-Time-Programmable-Read-Only Memory provided with a twin cell array having a multi-threshold-voltage level for encrypting a secret key.

BACKGROUND

Presently, the conventional approach implements an identifier (ID) by way of electrically blow able fuses (referred to as eFUSEs). It is known in the art, that such IDs are not secure because the eFUSE ID bits can be easily detected by de-layering the chip.

Several methodologies, mechanisms, and systems can be employed to allow intrinsic features of a computer chip or integrated circuit (IC) to be used to generate one or more unique and difficult to replicate IDs corresponding to the chip or IC, particularly when determining a unique intrinsic ID. This approach is known as Physical-Unclonable-Fuse (PUF).

Generally, the challenge of using PUF-based ID approaches resides in providing the intrinsic ID function that generates the PUF ID while resulting in stable generation. Stable PUF generation has been found to be a difficult task.

In order to overcome the stated problem, PUFs require various testing procedures during PUF generation to eliminate unstable PUF bits.

Therefore, PUFs requiring fuzzy match detection during PUF authentication make it possible to authenticate the chip even with unstable PUF bits. An implementation of determining a unique intrinsic ID of a chip with fuzzy match detection has been attempted. However, this approach has been found to increase the system overhead.

Self-authenticating chip architecture has been found to reduce significantly the system overhead over the conventional fuzzy match detection approach. However, even with this approach, the system and chip overhead is still large, and therefore employing this approach for low cost system such as consumer market is not suitable.

Accordingly, the reliability of self-identifying chips has become a necessity in contemporary security and encryption applications. However the existing self-authentication approach using PUF as a secret key is still not cost effective. Therefore, it would be beneficial to create a secret key storage without using PUF for chip identification.

More particularly, fabless semiconductor design entities require an industry capable of achieving a cost-effective solution to internal and external IC clients that provides chip authentication and identification with minimal design and area overhead. The solution requires further a minimum amount of additional circuitry or mask levels on the chip, and sufficiently simple that they do not impact the yield, and it being adaptable to a broad range of products.

SUMMARY

Accordingly, in an embodiment of the disclosure, an implementation of a stable chip ID achieved by storing the ID in an encryption engine is provided. The engine can employ a Multi-time Programmable Read Only Memory (MTPROM) to store one multi-threshold voltage level per cell having charge trap characteristics and outputting a stable and encrypted digital state for authentication.

In another embodiment, a cell device provides a storage element of one of the multi-threshold voltage levels, wherein each prospective threshold voltage level provides a cell level encryption by overwriting the previously stored threshold voltage of the cell. The cell device uses two devices creating a stable and encrypted digital output using a differential sense amplifier in which the multi-threshold-voltage level is overwritten to generate a new encrypted state while outputting the encrypted digital state needed for authentication.

In another embodiment, the encryption engine can make use of a public ID to be openly read out, and a secret key that can be read out subsequent to running an overwriting procedure to the secret key, wherein said secret key is stored in the cells, each storing one of the multi-threshold-voltage levels, and at least one of the cells is overwritten to another threshold voltage level for encryption.

In a further embodiment, a system is provided to enable secure chip authentication using an encryption engine having a twin cell array, where each cell stores one of the multi-level-threshold voltage levels in each pair of devices as the secret key. The engine receives a challenge (CHG) for altering (overwriting) the multi-threshold-voltage levels, and outputs an encrypted secure digital output with a differential sense amplifier coupled to the twin cell array for authentication that follows the overwrite procedure. The engine can store the chip secret key in a system database alongside the memory cells' threshold voltage levels and the public ID that is stored in the system database at the deployment phase.

In yet a further embodiment, the method uses a first step for readout by the system of the public ID from the chip having the encryption engine; a second step for searching the public ID for a corresponding chip secret key and memory cells' threshold voltage levels in its database; a third step for generating a CHG preferably using a random generator to alter (program/overwrite) the previously stored threshold voltage level of at least one of the memory cells in the chip; a fourth step for sending the CHG to the chip having the encryption engine; a fifth step for enabling an overwriting procedure to said at least one of the memory cells based on the input of the CHG; a sixth step for outputting an encrypted secure digital output to the system; and a seventh step for authenticating the chip if the encrypted secure digital output is the same as the database record, and otherwise not authenticating the chip, while updating the secret key record in the system by way of the same CHG provided to the chip.

BRIEF DESCRIPTION OF THE DRAWINGS

The present disclosure will be understood and appreciated more fully from the following detailed description of the disclosure, taken in conjunction with the accompanying drawings of which.

DETAILED DESCRIPTION

Figure 2:
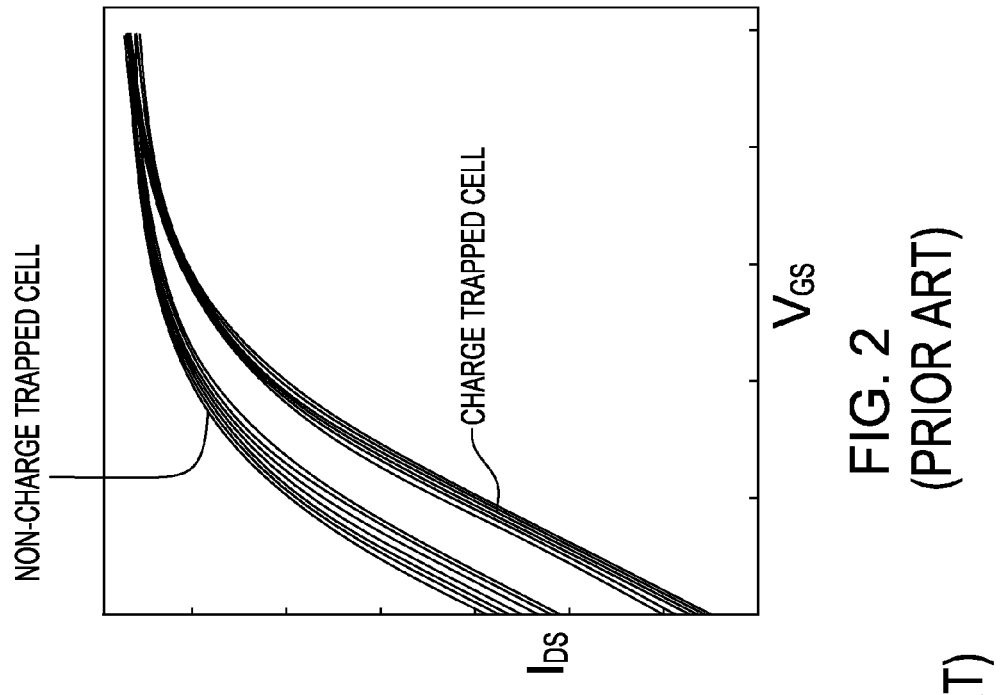
FIG. 2 shows a prior art measure of the source to drain current (IDS) with respect to the gate to source voltage (VGS) of the NMOS transistor.

Embodiments of the methods of the present disclosure are described herein; however, it is to be understood that the disclosed embodiments are merely illustrative of the described methods that can be embodied in various forms. In addition, each of the examples given in connection with the various embodiments of the disclosure is intended to be illustrative, and not restrictive.

A high performance NMOS with a high-K dielectric, e.g., Hafnium ($Hf_4$) oxide, shows a charge trap behavior. Referring to the prior art FIG. 1, NMOS (100) has an initial threshold voltage (VT) of $VT_0$. The vacant oxygen point (140D) in the $Hf_4$ oxide (140) trapping electrons (140A) in accordance with a condition that applies a high voltage to the gate (110) and further that applies a high voltage between the source (120) and the drain (130), such that the NMOS strongly turns on to flow a large current through the channel (150). The trapped charge (e−) increases the NMOS threshold voltage to $VT_1$ (=$VT_0+\Delta VT$). Trapped electrons (e−) (140B) can be eliminated by applying a negative voltage between the gate (110) and the source (120), resulting in recovering the $VT_0$ condition.

FIG. 2 shows a prior art measured source to the drain current (IDs) with respect to the gate to the source voltage ($V_{GS}$) of the $Hf_4$ NMOS transistor (100). The IDS can be measured while applying a programming and resetting conditions several times. As expected, trapping electrons increases the NMOS threshold which results in a current smaller than that without trapping. The voltage $VT_1$ of the charge trapped NMOS can be successfully reset to the $VT_0$ of a non-charge trapped NMOS. The charge-trap based embedded Multi-Time-Programmable-Read-Only-Memory (eMTPROM) may use $VT_0$ and $VT_1$ for data bits 0 and 1.

Figure 3:
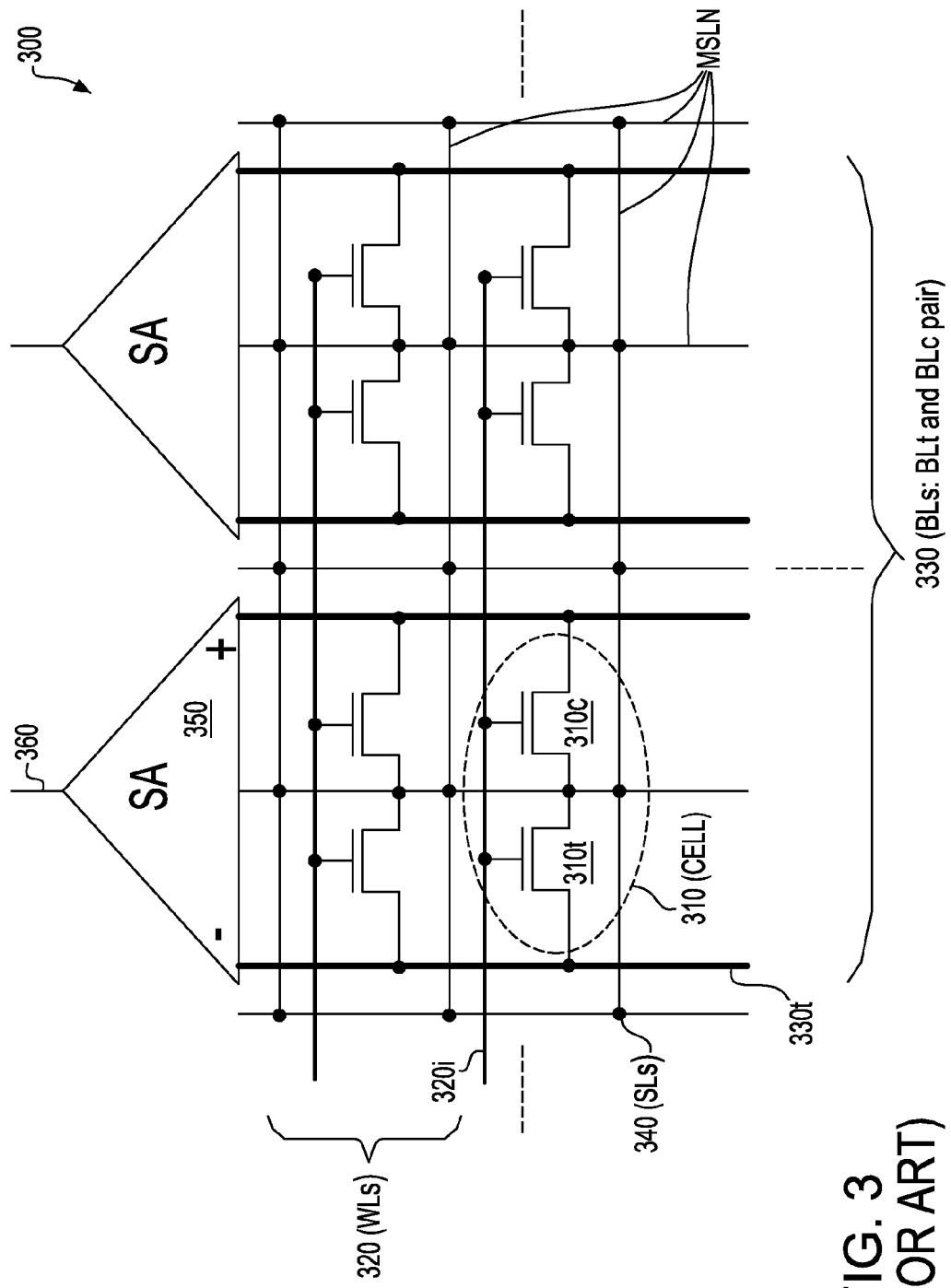
FIG. 3 is a prior art array structure of a Multi-Time-Programmable-Read-Only-Memory (eMTPROM).

FIG. 3 shows a prior art eMTPROM array (300), consisting of a plurality of charge trap memory cells (310), each consisting of a pair of NOMS (310t and 310c) supported by wordlines ((320) WLs) and a bitline pair (330t and 330c) for selecting respectively the row and the column of the cells. Data bits are stored by trapping the charge to one of the NMOS of the pair (310t and 310c). More particularly, the data bit of 0 is written by trapping a charge to the NMOS (310c) while maintaining the untrapped state for the NMOS (310t). The write can be realized by activating the corresponding wordline (i.e. 320i) to 2V and discharging the bitline (330c) to GND while raising the meshed source-line (SL) network (MSLN) to 1.5V. The other bitline (330t) maintains the MSLN voltage at 1.5V, resulting in a large current only to the NMOS (310c), and trapping the charge to the NMOS (310c) without trapping the charge to NMOS (310t). Similarly, a data bit 1 is achieved by trapping a charge to the NMOS (310t) while keeping the untrapped charge state for NMOS (310c) Likewise, it can also be realized by activating the corresponding wordline (320i) to 2V and discharging the bitline (330t) to GND while raising the MSLN to 1.5V. The other bitline (330c) maintains the SL voltage at 1.5V, resulting in a large current only to the NMOS (310t), and trapping the charge to the NMOS (310t) without trapping the charge to NMOS (310c).

When in a read mode, a wordline (i.e. WL 320i) is activated to the voltage VDD. The voltage of SL (340) of the MSLN is VDD. Then, both BLs (330t and 330c) are weakly discharged. This results in developing a differential voltage to the BL pair (330t and 330c). If BL discharges the strength to a level sufficiently low (weak). The differential voltage will be close to the VT difference of the two NMOS (310t and 310c), where one of the NMOS has a higher VT because of the charge trap. The differential voltage is sensed by a differential sense amplifier (SA 350), resulting in generating a digital bit as an output (360) of the sense amplifier. For a cell strong 0, the SA output (360) is 0, because the VT of the NMOS (310c) is higher than the VT of the NMOS (310t), resulting in a voltage of the bitline (330c) lower than the bitline (330t). For the cell strong 1, the SA output (360) stands at 1 because the VT of the NMOS (310t) is higher than the VT of the NMOS (310c), resulting in a voltage of the bitline (330t) lower than the bitline (330c).

Figure 1:
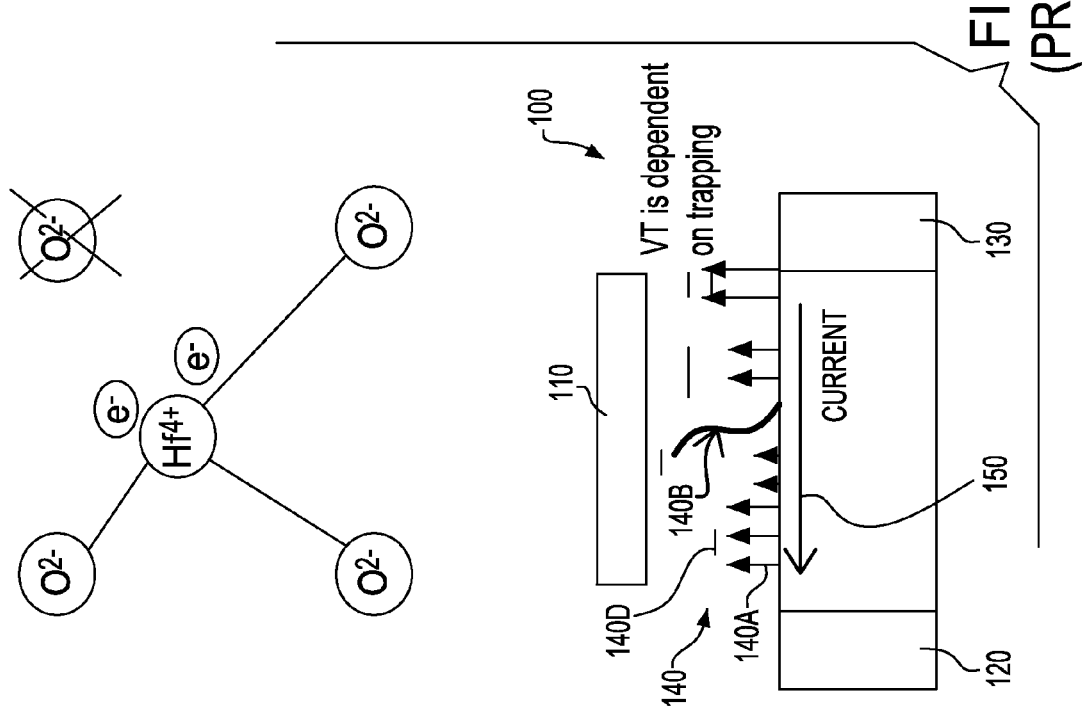
FIG. 1 illustrates the physics of a prior art NMOS transistor showing a charge trap.

The trapped charge in NMOSs (310t and 310c) can be eliminated by applying a negative wordline voltage (i.e. −1V) while keeping the MSLN voltage at high voltage (i.e. 1V), as described in FIG. 1. Referring back to FIG. 3, MSLN is common for all the arrays resulting in eliminating at the same time the charge from all memory arrays. However, by proper control of MSLN and WL, it can be possible to eliminate the charge only for a specific segment. All the cells coupled to the selected columns can be initialized to an initial threshold voltage ($VT_0$) by eliminating a charge from the cells coupled to the selected BLs at 1V (unselected BLs at 0V) while forcing all the WLs at −1V. Similarly, all the cells coupled to selected rows can be initialized to an initial threshold voltage ($VT_0$) by eliminating a charge from the cells coupled to the selected WLs at −1V (unselected WLs at 0V), while forcing BL at 1V. Ultimately, only a selected cell can be initialized to an initial threshold voltage ($VT_0$) while activating only one selected WL and one selected BL to −1V, and 1V, respectively, while keeping all other BLS and WLs at 0V.

The prior art uses a charge trap characteristic to store a data bit in twin cell memory array (300) for a Multi-Time-Programmable-Read-Only-Memory (MTPROM) for non-volatile storage purpose, in contrast with an embodiment of the disclosure, wherein a charge trap characteristic not only stores the secret key, but it also encrypts a key using multi-threshold-voltage level for hardware security. This results in a special purpose encryption engine that uses preferably a twin cell memory array with charge trap characteristics. Unlike a conventional multi-level nonvolatile memory, the output from the encryption engine is a 1 data bit using two devices, each storing one of the multi-threshold voltage levels, with details thereof to be described hereinafter.

Figure 4:
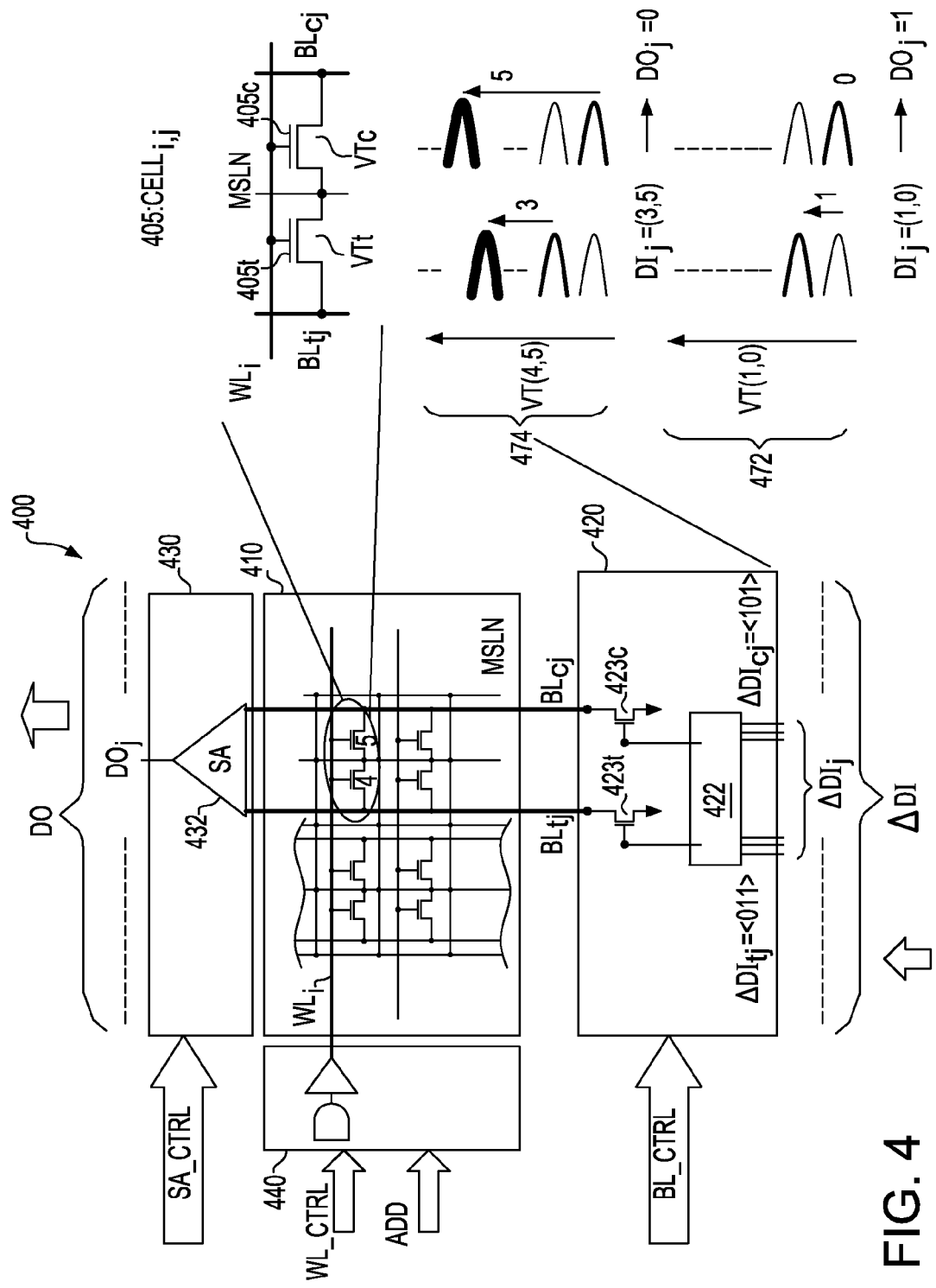
FIG. 4 shows an encryption engine having a twin cell array, a bitline driver block, a word line driver block, and a sense amplifier block according to an embodiment of the disclosure, wherein the exemplary figure illustrates the multi-threshold-voltage level control method employing a charge trap characteristics included therein.

Referring to FIG. 4, in an embodiment of the disclosure, a memory (400) is illustrated for use of the encryption engine, wherein the memory (400) consists of a twin cell memory array (410) controlled by a bitline driver block (420), a sense amplifier block (430), and by the wordline driver block (440). The twin cell memory array (410) consists of a plurality of two cells (405), each having two NMOS (405t and 405c) arranged in the memory array. The gate nodes of all the twin memory cells in a row are coupled to the corresponding wordline (WLi for row i) for selecting a row. The drain nodes of all the twin memory cells in the column are coupled to the corresponding bitline pair (BLtj and BLcj for the column j) for the selection of the column. The bitline pair is coupled to the corresponding differential sense amplifier (432). Optionally, a multiplexer (column switch) can be included prior to coupling the BLs to SA to share SA to multiple columns, which is known in the art, and therefore will not be described. The source nodes of the all the twin memory cells (405) can be coupled to the Meshed-Source-Line-Network (MSLN). Optionally, the MSLN can be split into several segments to allow for selective initialization for recovering the initial threshold voltage of only the selected MSLN segment, which is also known and therefore will not be described. All the wordlines are 0V, and the bitlines, and MSLN are pre-charged to VDD (1V) in a stand-by state.

Programming the secrete key (to be described hereinafter) to a target cell (CELLi,j) is enabled by the following steps. A corresponding WL (WLi) coupled to the target cells (CELLi,j) is activated to an elevated WL voltage (2V) by the wordline driver (440). Prior to the WL activation, MSLN is raised to an elevated voltage (1.5V). The BL (BLtj, and BLcj) coupled to the target cell is then discharged by the corresponding NMOS (423t and 423c) in the bitline driver block (420). Unlike a conventional MTPROM, the NMOS s (423t and 423c) in the BL driver block of each column is controlled by a time dependent overwrite logic circuit (422). The time dependent overwrite logic circuit (422) brings the bitline pull down using a corresponding NMOS (432t and 432c) for the number of programming cycle (=programming write time) determined by the command: ΔDIj (or (ΔDItj) for the cells coupled to BLtj, and ΔDIcj for the cells coupled to BLcj)). The command ΔDI includes three binary vector i.e. <011> for each of ΔDItj and ΔDIcj which defines the programming cycle. For example, the command ΔDIt<011> and ΔDIc<101> means that the programming cycle is 3 and 5 for target 405t and 405c, respectively. The command is given by challenge (CHG) discussed later. For simplicity, 3b vector may be written by decimal number (ΔDIt<3> and ΔDIc<5>). The command may be illustrated as ΔDI<3,5> for one symbol.

Figure 5:
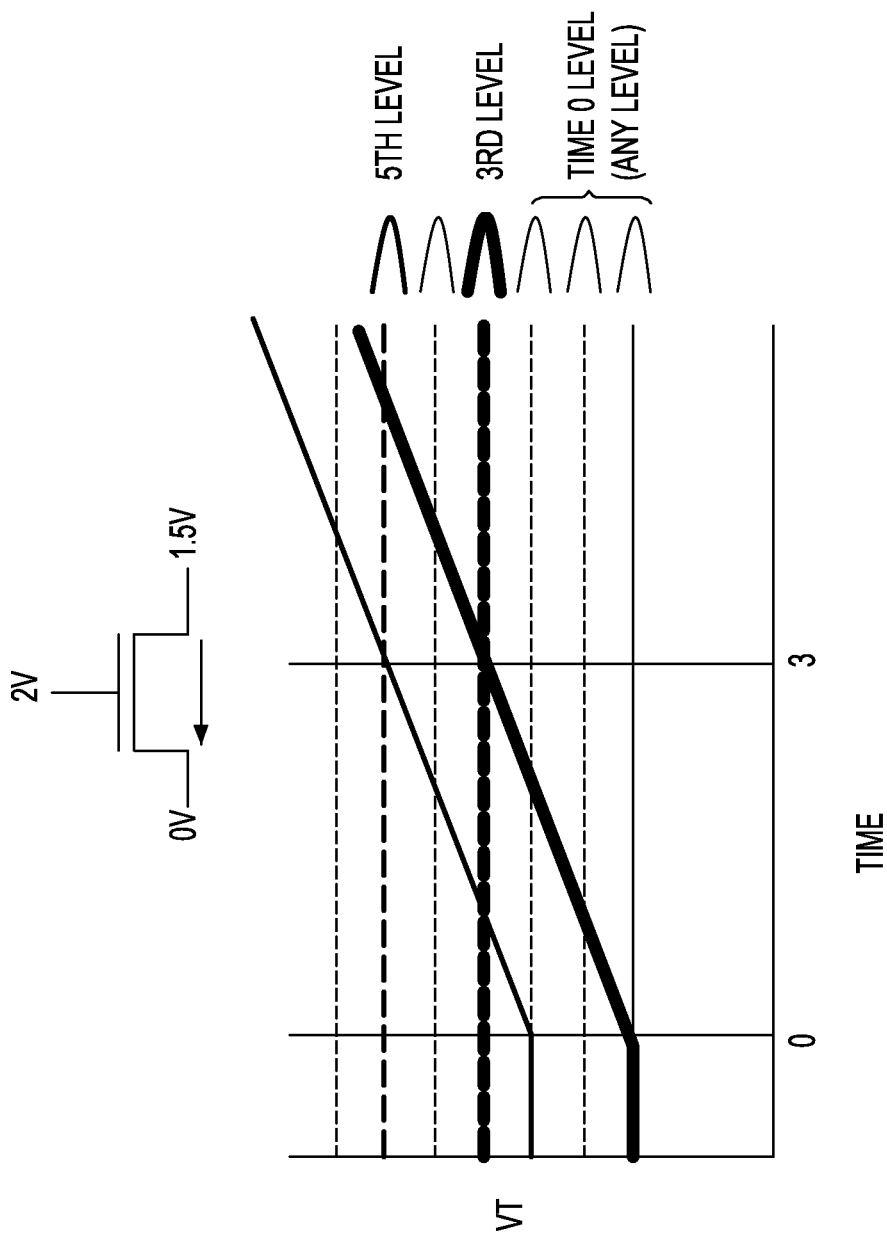
FIG. 5 illustrates the voltage condition required to program the NMOS devices, wherein the relationship between the programmed multi-threshold-voltage (VT) level and the programming time (TIME) likewise are also included, according to an embodiment.

The following description assumes that the number of programming cycles per command ranges from 0 to 7, which is programmed by the command ΔDI. An amount of charge trap can increase as the write time increases during a write operation to the NMOS of the cell, which uses an elevated wordline voltage (2V) while applying a high voltage between the source and drain (1.5V), as shown in FIG. 5 that results in creating up to 8 threshold level (i.e., $0^{th}$ VT level to $7^{th}$ VT level) for each NMOS (405t and 405c) of the cell (i.e. 405: CELLi.j), when NMOS is selected for programming. The data input bit (ΔDIj) for controlling the target VT level programming uses 3b for each of the pull-down-NMOS driver (423t and 423c) as shown in FIG. 4. The ΔDIj that enables programming the corresponding target VT shift is given including the CHG (described hereinafter). It is noted that ΔDIj is not the actual VT level but the shift (or offset) from the previous VT level. By way of an exemplary illustration, when CHALLENGE (CHG) includes a target of VT shift of 3, the 3 bit ΔDIj input for the corresponding overwrite logic circuit is (011), where the least significant bit is the right number of 1 resulting in the use of the write cycle number of 3, increasing the VT level to the third VT level if VT is initially a 0th VT level before overwriting operation. If VT is initially the 2nd VT level, the VT following overwrite will be the $5^{th}$ VT level. ΔDIj can be controlled by choosing the write time (TIME) required for the VT shift because the amount of the VT shift is not determined by the initial VT level, but the TIME as shown in FIG. 5.

Still referring the FIG. 4, it is assumed that the first cycle (e.g., prior to any programming, both NMOSs have an initial VT level ($0^{th}$ VT level. No charge is trapped in the NMOS 405t and 405c) illustrating (VT(0,0)). The secure key programming to the memory for the encryption engine (400) is realized in a secure private environment, wherein VT(A,B) denotes that VTs of NMOS (405t) and NMOS (405c) are in A and B VT level, where A and B are 0 to 7, respectively. As described previously, the VT level can be controlled by the previous VT level and programming time for a new VT, as shown with reference to FIG. 5.

The following description assumes that CHG of ΔDIj (ΔA,ΔB) denotes that VTs of NMOS (405t) and NMOS (405c) will be shifted (or incremented) by ΔA and ΔB level, respectively. For example, assuming that the initial state of the VT(1,3), the CHG of ΔDIj (2,1) results in having VT(3,4) after the programming.

More particularly, in step 472, CHG of ΔDIj (1,0) is given, which leads to VT shift (increment) target of the NMOS 405*t* and 405*c* in the target cell (CELLi,j) are 1 and 0 from the previous state VT(0,0), respectively, resulting in an overwrite of the NMOS VT level of the pair to VT(1,0) in step 472 that allows storing the secure key having VT(1,0) in the memory (400). The system stores the VT(1,0) to the database for future filed authentication.

For authentication of a filed request, in step 474, the CHG ΔDIj (3,5) is given, denotes the VT shift (increment) target of NMOS405*t* and 405*c* in the target cell (CELLi,j) are 3 and 5 from the previous level VT(1,0), respectively, leading to overwriting the NMOS VT level of the pair to VT(4,5) in step 474.

Following the overwriting process in CHG, a read mode for the stored key is enabled for the target CELLi,j. The output signal DOj will be 0 because the VT level ($5^{th}$ VT level) of the NMOS (405*c*) is higher than the $4^{th}$ VT level of NMOS (405*t*). DQj of 0 will be the output to the master system (described hereinafter). While the output of DOj can be 0 as long as VT of the NMOS (405*c*) is greater than NMOS (405*t*), it is not possible to extract the actual VT level stored in the twin NMOSs (405*t* and 405*c*) unless the initial VT level VT(1,0) is known, enabling the encryption function and allowing a secure communication to the master system. The VT overwriting step (474) from the previous step (472) using challenge (CHG) of ΔDIj will alter the VT previously stored in the multi-threshold-voltage level, encrypting the key for the subsequent authentication process.

Figure 6:
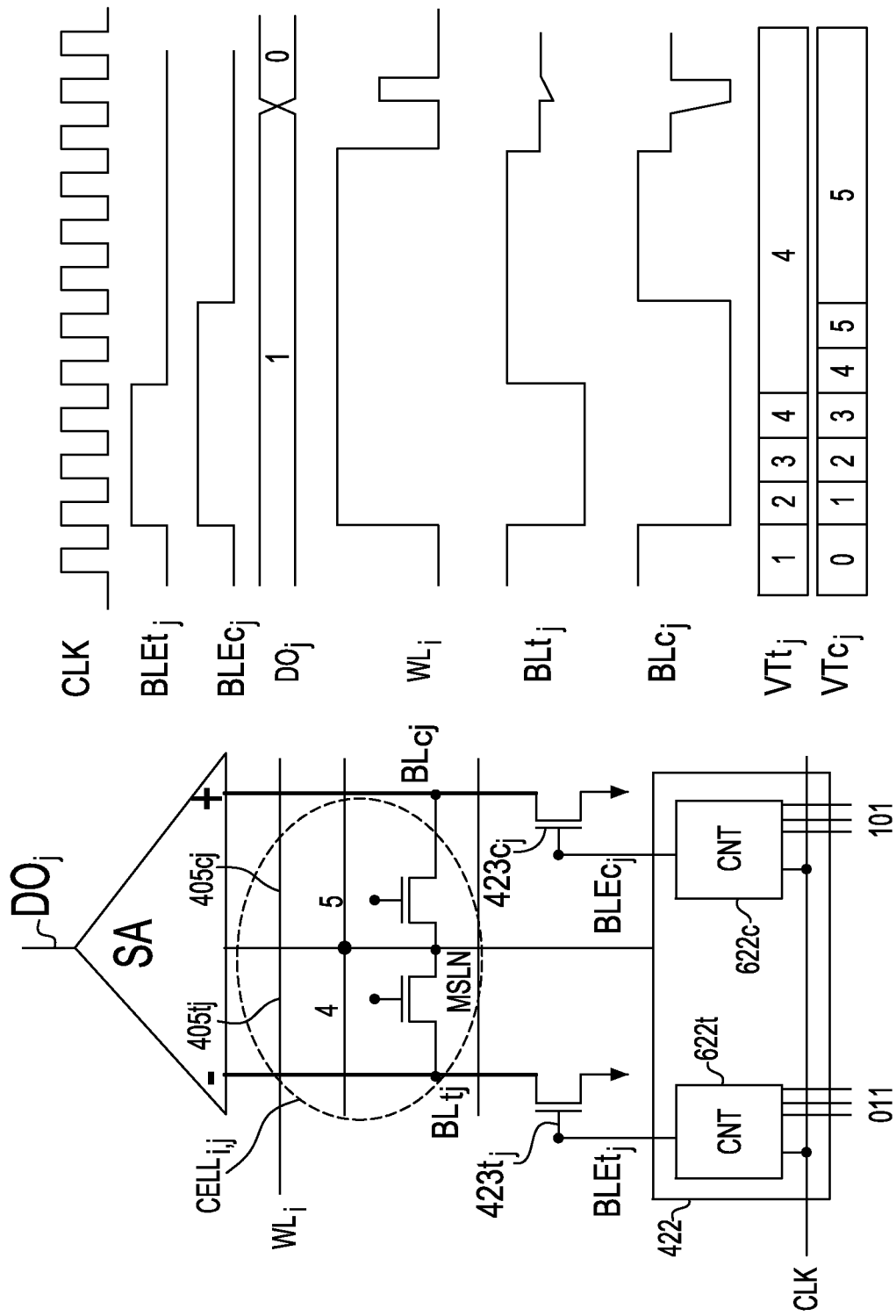
FIG. 6 depicts the circuit to alter (program) the multi-threshold-voltage level of the memory cell with a timing control circuit including a timing diagram.

FIG. 6 shows a detailed schematic of a multi-threshold-voltage level programming method for controlling the write time such that the VT of each of the NMOSs (405*t* and 405*c*) of the target CELLi,j are programmed to the target multi-threshold-voltage level. Assuming that the target cell has a VT level of VT(1,0) (472 in FIG. 4), CHG ΔDIj (3,5) is decoded to 3 bits of (011) and (101) and inputting it to the overwrite logic circuit (422) wherein ΔA and ΔB of ΔDIj (ΔA,ΔB) are used for defining the number of clock cycles for enabling the NMOS (423*tj* and 423*cj*) with ΔA and ΔB, respectively. The overwritten logic circuit consists of CLK having a duty cycle to an amount of time required to shift (or increment) VT of NMOS by 1, a countdown circuit CNT (622*t*) with an output controlling the gate of NMOS(423*tj*) and another countdown circuit CNT (622*c*) with an output controlling the gate of NMOS(423*cj*). The CNTs (622*t* and 622*c*) output signals (BLEtj and BLEcj) enable the corresponding gate of NMOS(423*tj*,423*cj*) for a number of CLK cycles based on the 3 bit input received. The waveform on FIG. 6 shows prior to receiving CHG, BLEtj and BLEcj at 0V, WLi at 0V, BLTj and BLCj at 1.5V, the VT on NMOS 405*tj* is 1 and VT on NMOS 405*cj* is 0, while DOj is 1 from a previous read operation. The circuit stands at standby at the moment and receives the CHG ΔDIj (3,5). The voltage on WLi is then ramped to 2V and stays high on for eight CLK cycles before setting it to 0V. The voltage on BLEtj is set at 1V and stays high preferably for three CLK cycles before setting it to 0V. The voltage on BLEcj is set to 1V and stays high for five CLK cycles before setting it to 0V. The BLtj controlled by BLEtj is set to 0V for three cycles before bouncing back to 1.5V, the voltage conditions effectively increasing the VT on the NMOS 405*tj* by 1 with the passing of each CLK cycle, resulting in a total increase of 3 VT level, which indicates after three CLK cycles the VT on NMOS 405*tj* changing from the $1^{st}$ VT level to the $4^{th}$ VT level. BLCj controlled by BLEcj is set at 0V for 5 cycles before bouncing it back to 1.5V, the voltage conditions thereof effectively increasing VT on NMOS (405*c*) by 1 when passing each CLK cycle, resulting in a total increase of 5 VT levels indicative that after five CLK cycles, the VT on NMOS (405*c*) changes from $0^{th}$ VT level to $5^{th}$ VT level. After the completion of eight CLK cycles, a read process is applied to CELLi,j by setting BLEtj and BLEcj to 0V, BLTj and BLCj to float, MSLN and WLi to 0.9V, the VT shift (or increment) between NMOS (405*t*) and NMOS (405*c*) resulting in a different voltage achieved on BLTj and BLCj and resulting in a DOj readout to 0. As described previously, DQj can be at 0 as long as VT of NMOS (405*c*) is higher than NMOS (405*t*). It is not possible to predict DQj output unless the exact VT level of the secret key is known. Because the secret key typically uses more than 100 bits, it renders impossible to extract the original secret key.

Figure 7:
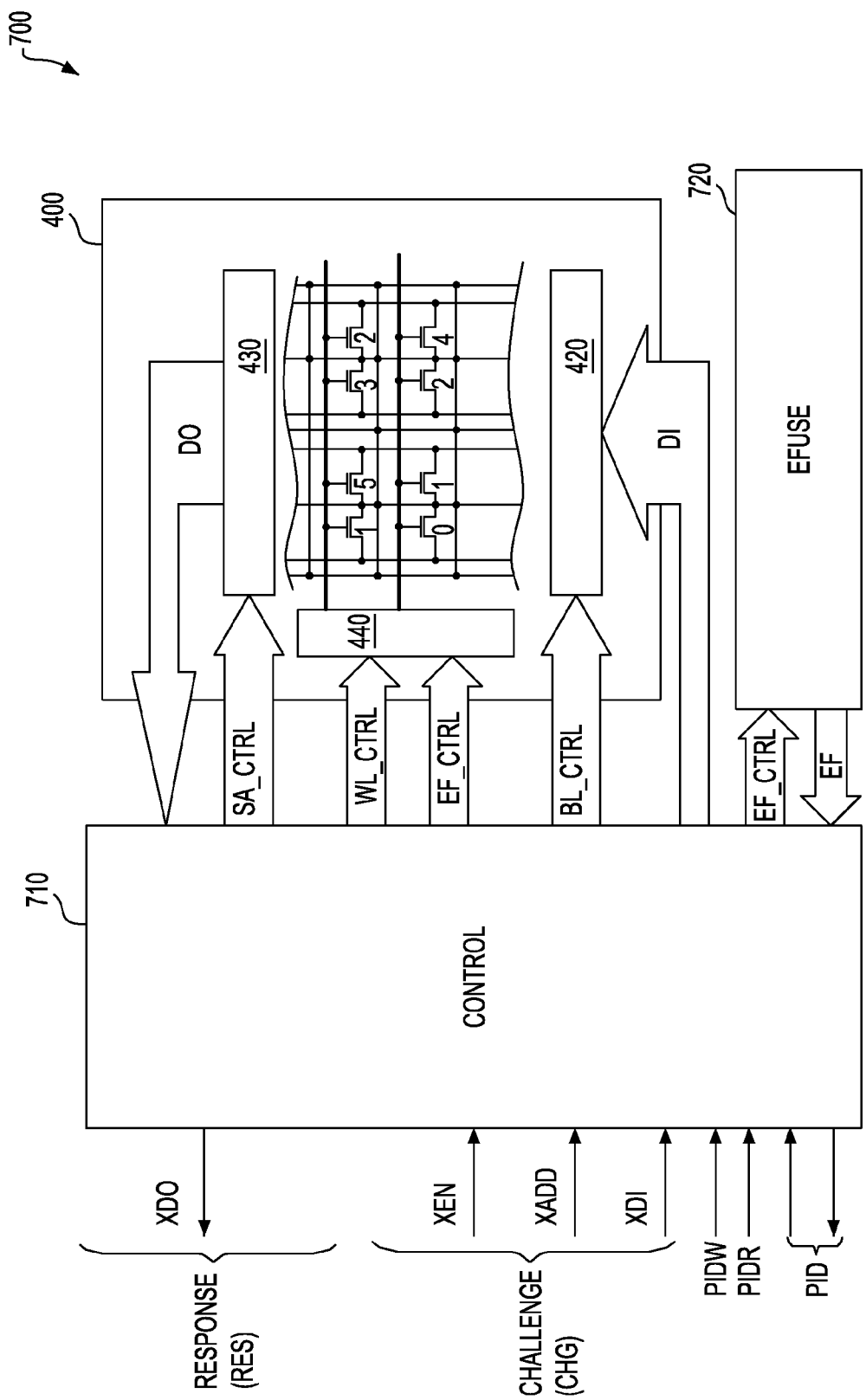
FIG. 7 shows a chip implementation that includes the encryption engine for storing the secret key in the cells with the multi-threshold-voltage level, an eFUSE block for storing the public ID, and the interfacing control block to facilitate communication between the chip and the system.

FIG. 7 illustrates an implementation of the chip (700) using the encryption engine (400), the eFUSE block (720) and the control (710) logic which interface the encryption engine and eFUSE block with the system. The eFUSE block controlled by signal EF_CTRL is used to store the public ID (PID) in an eFUSE write mode, or read it in the eFUSE read mode, respectively. The eFUSE write mode is enabled when a public ID write command (PIDW) is given to the chip. The public ID can be freely readout by way of the interface of the control logic (710) when the chip receives the public ID read command (PIDR). The encryption engine (400) used to store the secret key cannot be readout or respond (RES) without the CHG process. CHG requires XADDR (memory address), XDI and XEN to enable the overwriting process to the memory cells. Then, it sends back response (RES) by way of the XDO ports. The XDO ports are coupled to the differential sense amplifier output from the twin cell memory array, as it is described with reference to FIGS. 4-6. For the registration process, all the memory cells are not programmed and have VT(0,0) level leading to an undetermined level of the XDO output. A secret key generation request is then received as the CHG by the control logic (710) and overwriting the VT(0,0) level to a new VT level. The initial secret key generation should be performed in a secure private system environment and kept in the system database as described hereinafter. The secret key or initial VT level will be used for authentication during a life-time usage in a customized or filed environment.

More particularly, the aforementioned authentication during the life-time usage in the customized or filed environment, the chip first receives the public ID read request that leads to sending the PID out from the eFUSE. The system then searches the secret key using PID. The system also generates a new CHG, which is to be sent to the chip, and at the same time, updates the secret key record in the system. When the chip receives CHG, the control (710) converts CHG to the inputs of the encryption engine (400) which enables new VT programming using the given CHG for the twin cell array (410), leading to overwriting the previously written secret key. The engine (400) then senses the overwritten secret key using a differential sense amplifier (430), and the results (DO) will be transferred to the control (710). Thus, the output signal XDO is sent as a RES to the system for authentication. As described previously, the encrypted as a result of the VT level to the binary digital DO conversion using differential sense amplifier (430). The secret key in both system and chip are updated using the CHG at each authentication process, improving the HW security.

Figure 8:
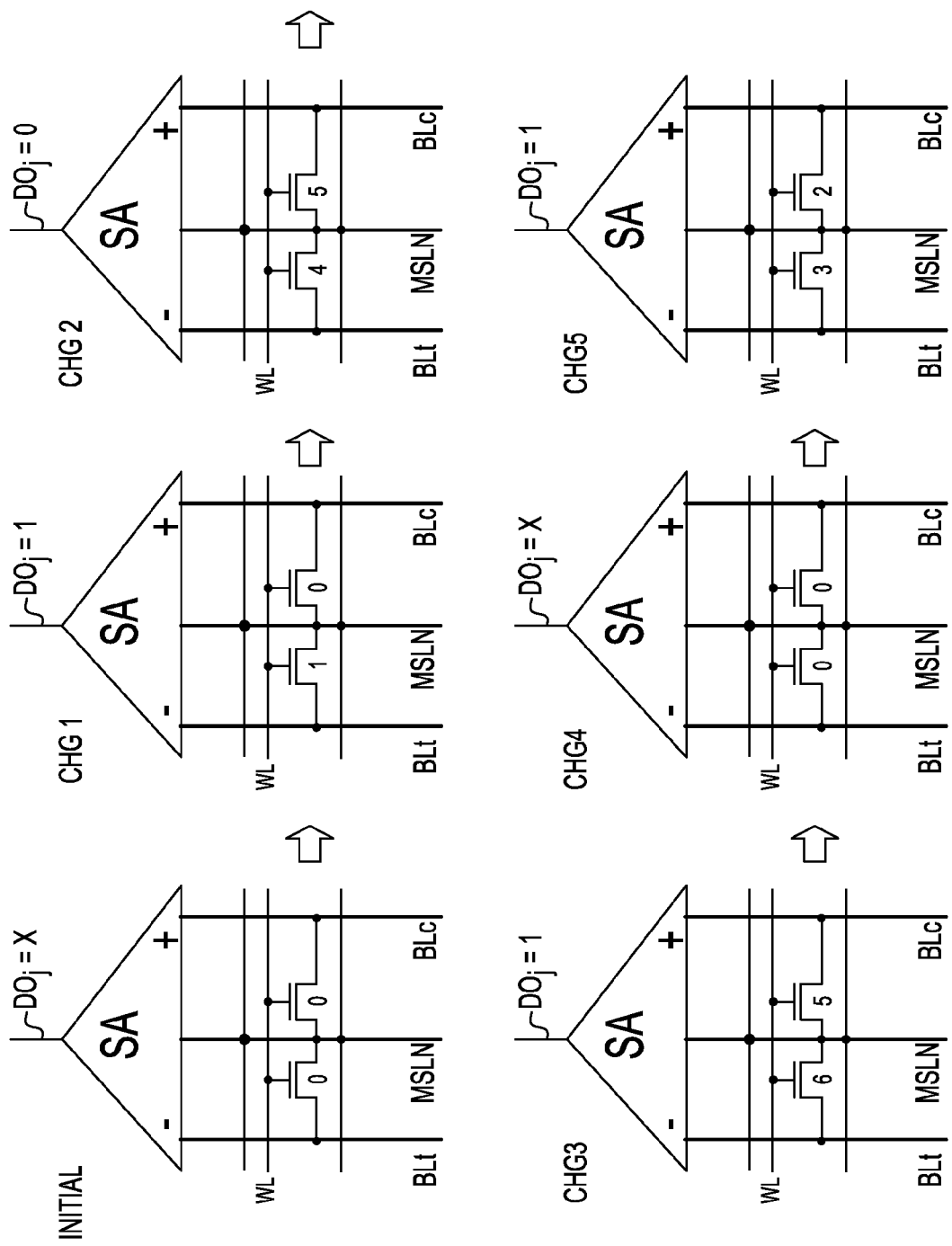
FIG. 8 is an exemplary illustration of a particular memory's DOj and encrypted multi-threshold voltage level during its usage in a field due to the CHG and response authentication process.

FIG. 8 illustrates an example of the VT of the memory cell went through during its lifetime usage in a customer (or filed) environment and a method of updating the secret key for multiple verifications. As previously described, the memory cell VT level is initially VT (0,0), the binary digital output of which may be indeterminably 0 or 1. This is indicative by DOj=X at the initial level, wherein j is the corresponding column coupled to the sense amplifier (SA) in the twin array. The level does not change until the request for storing of the secret key as a first CHG (CHG1) is received for registration. When the chip receives the CHG1 of ΔDIj (1,0), overwriting the memory cell VT level to VT(1,0), uses an output DOj of 1 for verification, concluding the registration process. The registration should preferably be done in a secure private environment.

The time for the actual authentication during the life-time usage as a customer or filed in an environment, a CHG2 process of ΔDI (3,5) is received, overwriting the memory cell VT level to a new level of VT(4,5). Therefore, the DO state as RES at 0. The newly formed VT level of VT(4,5) updated naturally form a new secret key. The CHG3 process of ΔDIj (2,0) is received, overwrites VT(4,5) and becomes VT(6,5) with DOj=1 as a result. Once again, DOj is sent out as RES for validation, with the newly formed level of VT(6,5) becoming the latest secret key. Thereafter, the CHG4 process of ΔDIj (−6,−5), or reset command (if the encryption engine supports) is received and overwrites VT(6,5), becoming VT(0,0), and DOj=X it is sent out as RES for verification. Because the system knows that the bit of DO will be in an undermined state of X (DOj=X), the bit is ignored during authentication. Note that no one other is aware whether the DOj is a valid bit or in an intentionally undetermined state, further improving the HW security. Then, CHG5 process of ΔDIj (3, 2) is received, overwrites VT(0,0) and becomes VT(3,2). The resulting DOj=1 is then sent out for validation. The present figure also implies that for a known VT(i,j) level, its DO can be calculated by comparing VTi to VTj. Then, DOj=1 if VTi>VTj; DOj=0 if VTi<Vtj, and DOj=X if VTi=VTj.

The relationship between VT(i,j) and CHG ΔDIj (x,y) is VT(final i, final j)=VT(current i+ΔDIjx, current j+ΔDIj y), the VT(current i, current j)=VT(0,0) when the array is not programmed.

Figure 9:
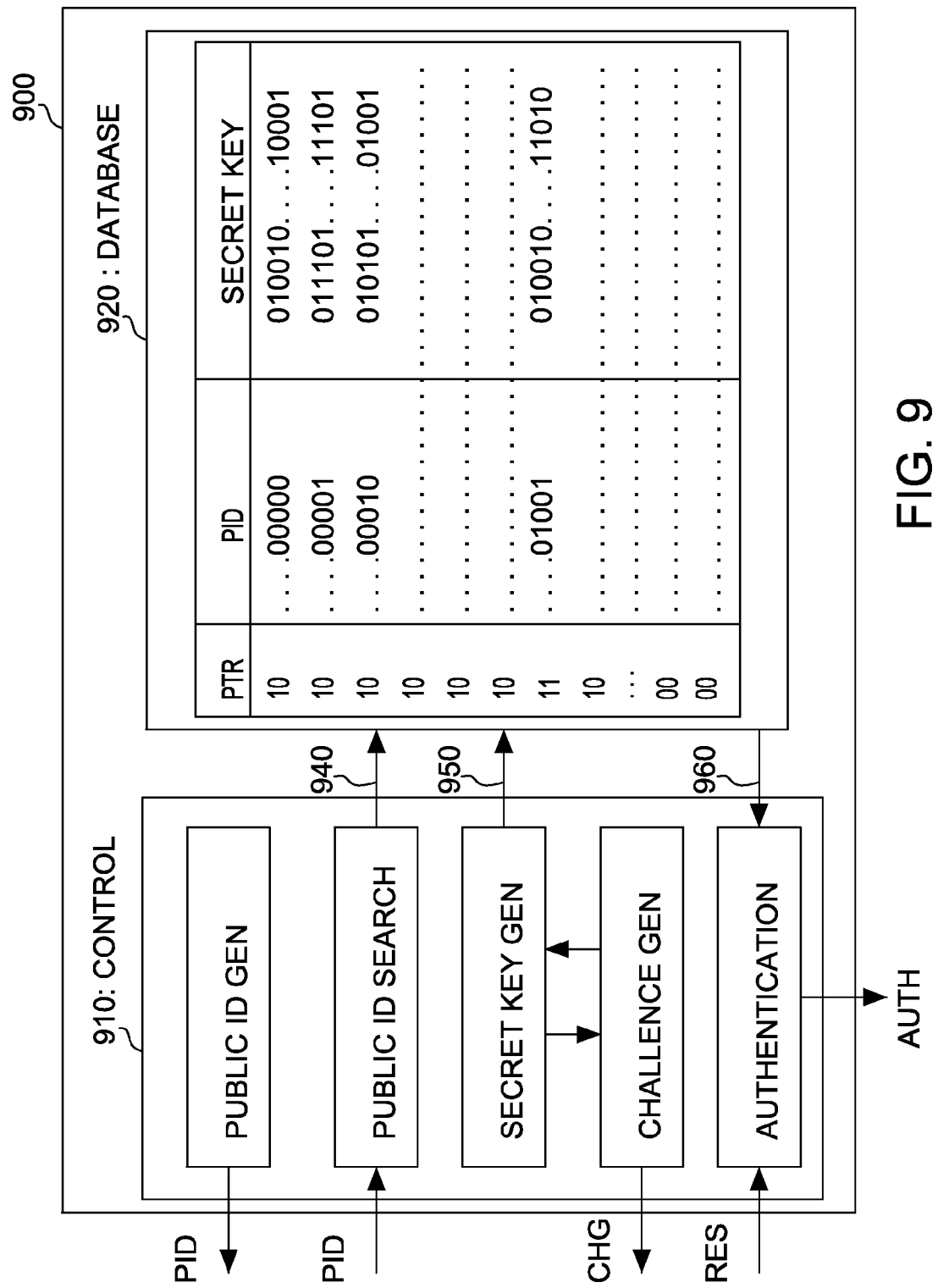
FIG. 9 shows the implementation of a system handling the registration and authentication process. The control block of the system serves for generating a public ID, a secret key and for sending a command to the control block on the chip. A database block is used to store the public ID, the secret key and the information necessary for the registration, in accordance with an embodiment of the disclosure.

FIG. 9 shows an implementation of the system for handling the chip ID verification. It consists of a control block (910) and a database block (920). The database block (920) can be subdivided in three sections. The first POINTER (PTR) section contains two digits: a first digit used to denote whether a public ID is already registered (0 for unregistered, 1 for registered); the second digit is used to transverse through the database one row at a time. The second section, PID, stores the public IDs that are registered. In the third section, the secret key is used to hold the string representing the VT of the memory cells on the encryption engine (400). For a given row on the database, if the first bit on the PTR section is 0, its associated PID is not registered and the associated row in the secret key section, all of which are at 0. The control block (910) is used as an interface with the chip, and more particularly, preferably with the control logic (710) in the chip (700) described on FIG. 7. The control block (910) enables a 5 step process, i.e., (1) the public ID gen which sends the command and the corresponding public ID (PID) to program it to the eFUSE block (720) of the chip (700) described with reference to FIG. 7; (2) the public ID search is used to perform a read-out of the PID from the eFUSE block(720), feeding it (940) into the database to find the matching entry for PID; (3) the secret key gen generates a random string and compute new secret ID (950) using the generated random string, and update the data base secret key record, (4) CHG gen, which generates the CHG base on the random string and sends it to the chip (700) to overwrite the secret key on the encryption engine (400) in the chip. (5) The authentication receives the RES string from the chip and also reads out the secret key (960) of the matching entry from the database (920), and computes the expected RES state using the secret key. By comparing the expected RES string (960) to the RES string from the chip (700), the AUTH signal from the authentication block is set at a 1, if the two strings match. The AUTH signal is set at 0 when the two strings do not match. The AUTH signal is set at 0 as a default condition. The detailed registration and the authentication process are described next using FIGS. 10 and 11.

Figure 10A:
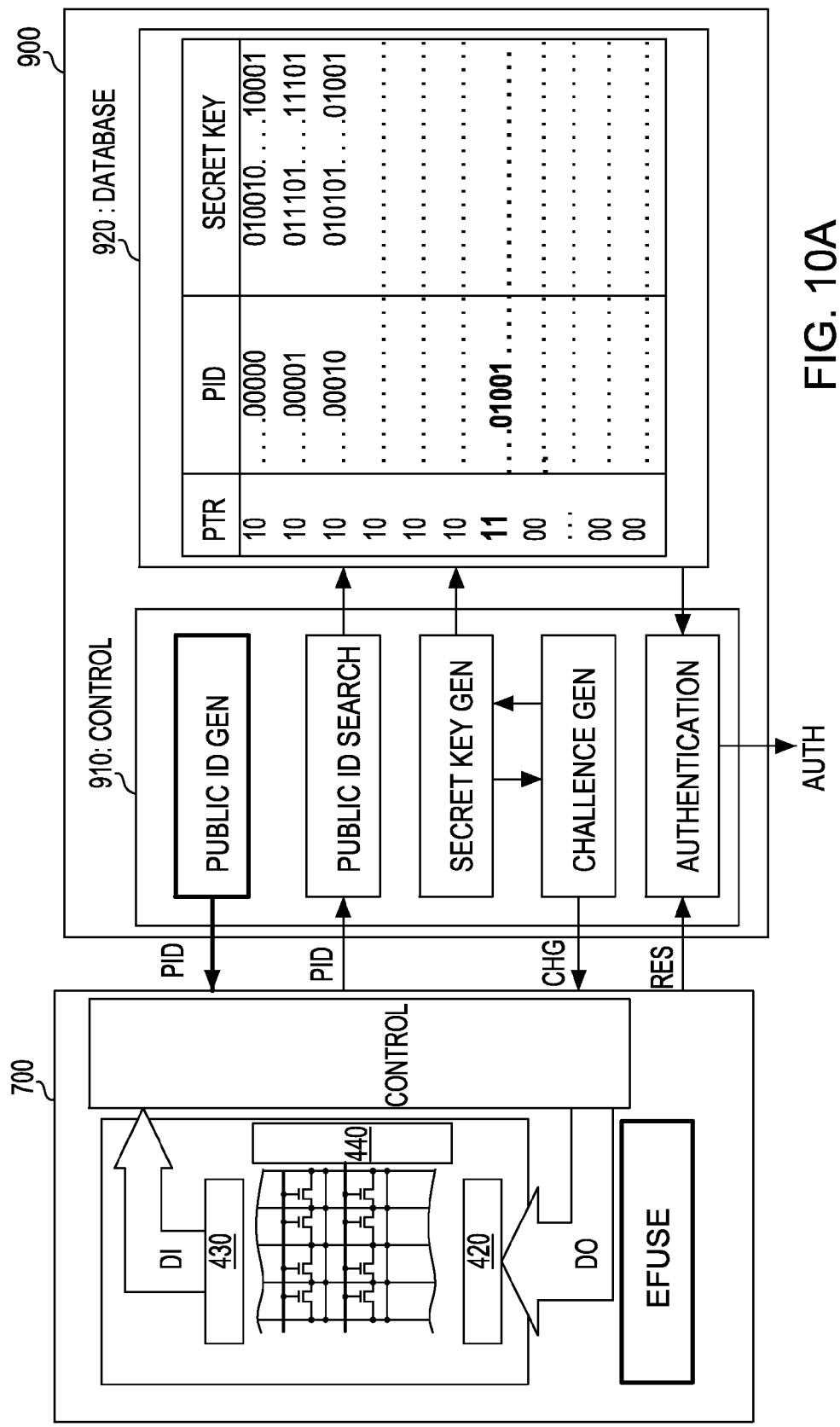
FIG. 10A shows a first step of the registration process, in which a chip is connected to the system for the first time. The system is assigned a public ID (PID) to the chip and acknowledges the registration on the system database.

Referring to FIG. 10, the registration step #1 is illustrated. Chip (700) is connected to the system (900) for the first time. PID in/out of the system is connected to PID out/in section of the chip. CHG and RES out section of the system are connected to the CHG RES section of the chip. The public ID gen block of the system, preferably a count up counter, increments the counter value by 1 and uses the resulting value, in this case . . . 1001 or line #9, to program the eFUSE block of the chip. The system then transversals through the database using the second bit of the PTR section, stopping at entry . . . 1001, because the first bit of the PTR section in the line #9 was 0 (indicating the public ID has not yet been registered to any chip), and setting the first bit to 1 so that the public ID for assigning the public ID to the chip (700). The system then requests the public ID write command (not shown) with the corresponding public ID (PID) to the chip (700), leading to writing the PID to the eFUSE.

Figure 10B:
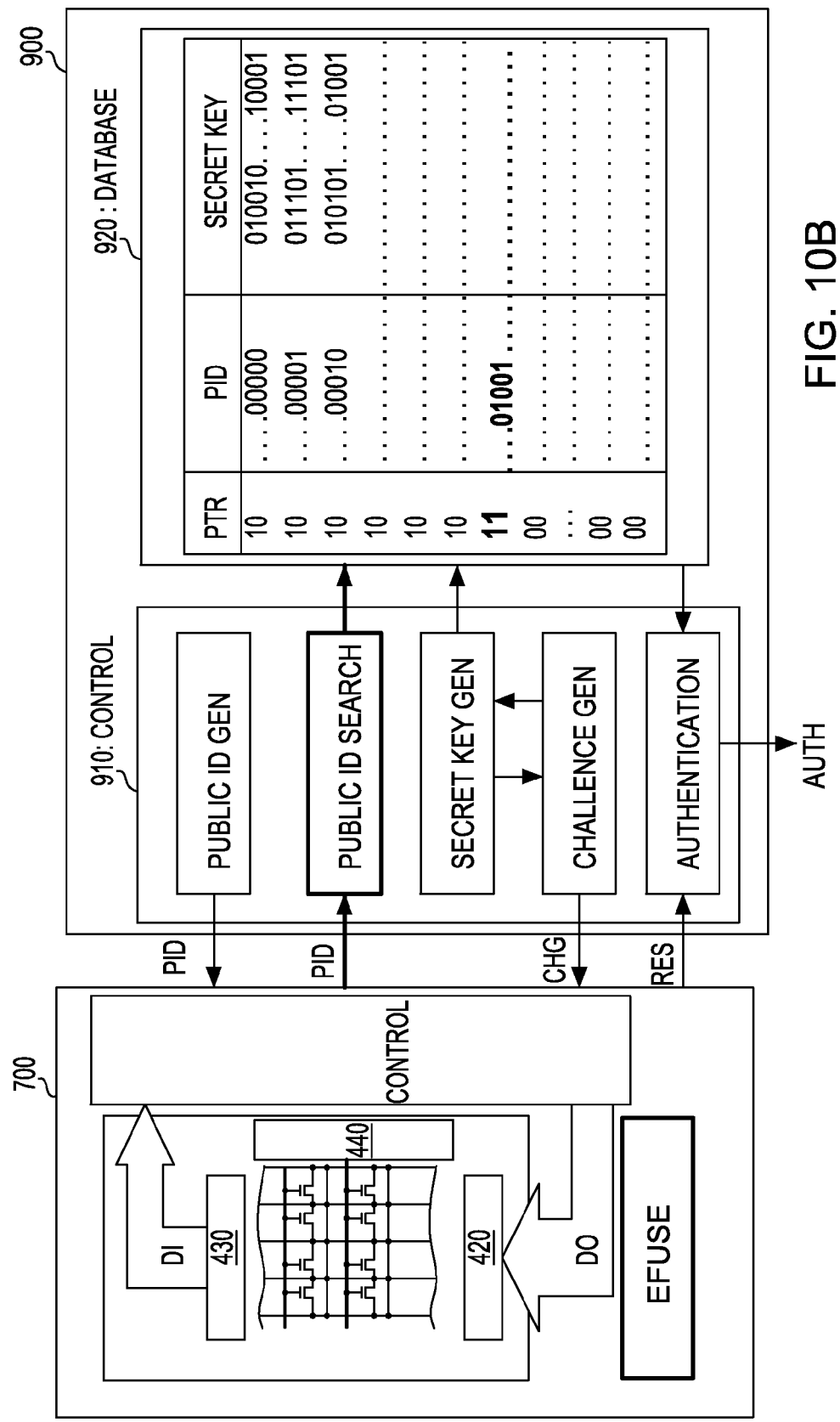
FIG. 10B illustrates a second step of the registration process, wherein the public ID of the chip is read by the system, finding a matching entry in the system database.

FIG. 10B illustrates the registration step #2. The system requests a public ID read command (not shown) to the chip (700). As a result, the newly programmed PID 1001, or line #9 is read out from the eFUSE by the system public ID search block. The system then traverses to the line #9 of the database and checks if the first bit of the PTR section on that entry is at 1. Since the system already sets the particular bit to a 1, the match is deemed to be found.

Figure 10C:
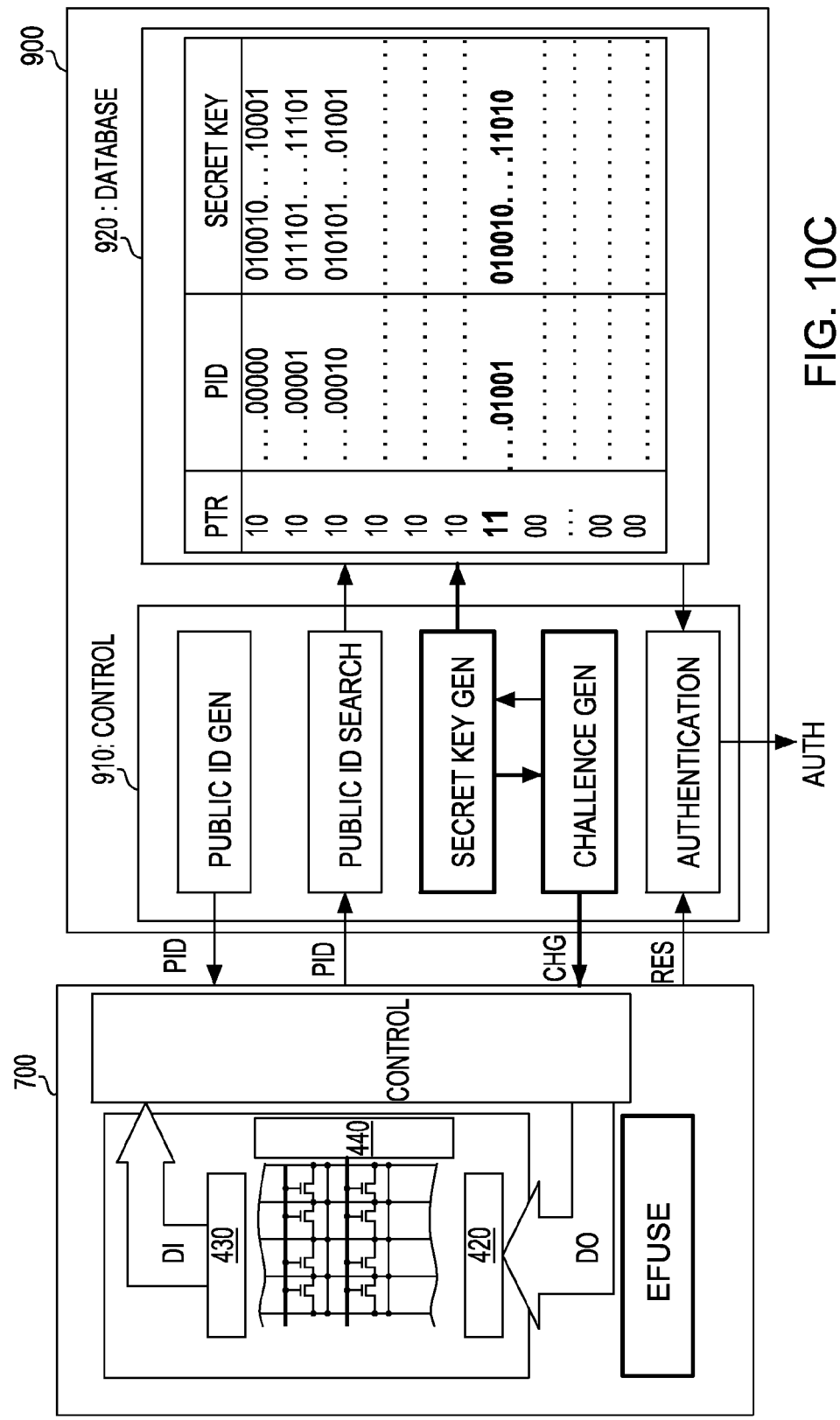
FIG. 10C depicts a third step of the registration process, wherein a secret key is generated and sent as a string of CHGs to the chip. The secret key is then stored in the secret key section of the database with the matching entry associated to the chip ID.

FIG. 10C shows registration step #3. With the public ID search block finding a match, the secret key gen block generates an random string, and compute and store the secret ID to the system database, and feeding the random string to the CHG gen block to generate a string of CHGs to be applied to the encryption engine. CHGs effectively used for ΔDIj (x,y) is sent to the chip, overwriting the initial VT level VT(0,0) to the secret key on the encryption engine. The database updates the section by adding ΔDIj (x,y) to the original value VT(0,0) stored on the section, in this case all at 0s, resulting in storing the VT level (x,y) of the memory cells of the encryption engine. The CHG process applied to the chip results in RES to be sent from the chip to the system for verification.

The registration process (steps #1-3) described above should be done preferably in a secure private environment, in view of the bits not yet being encrypted.

Figure 11A:
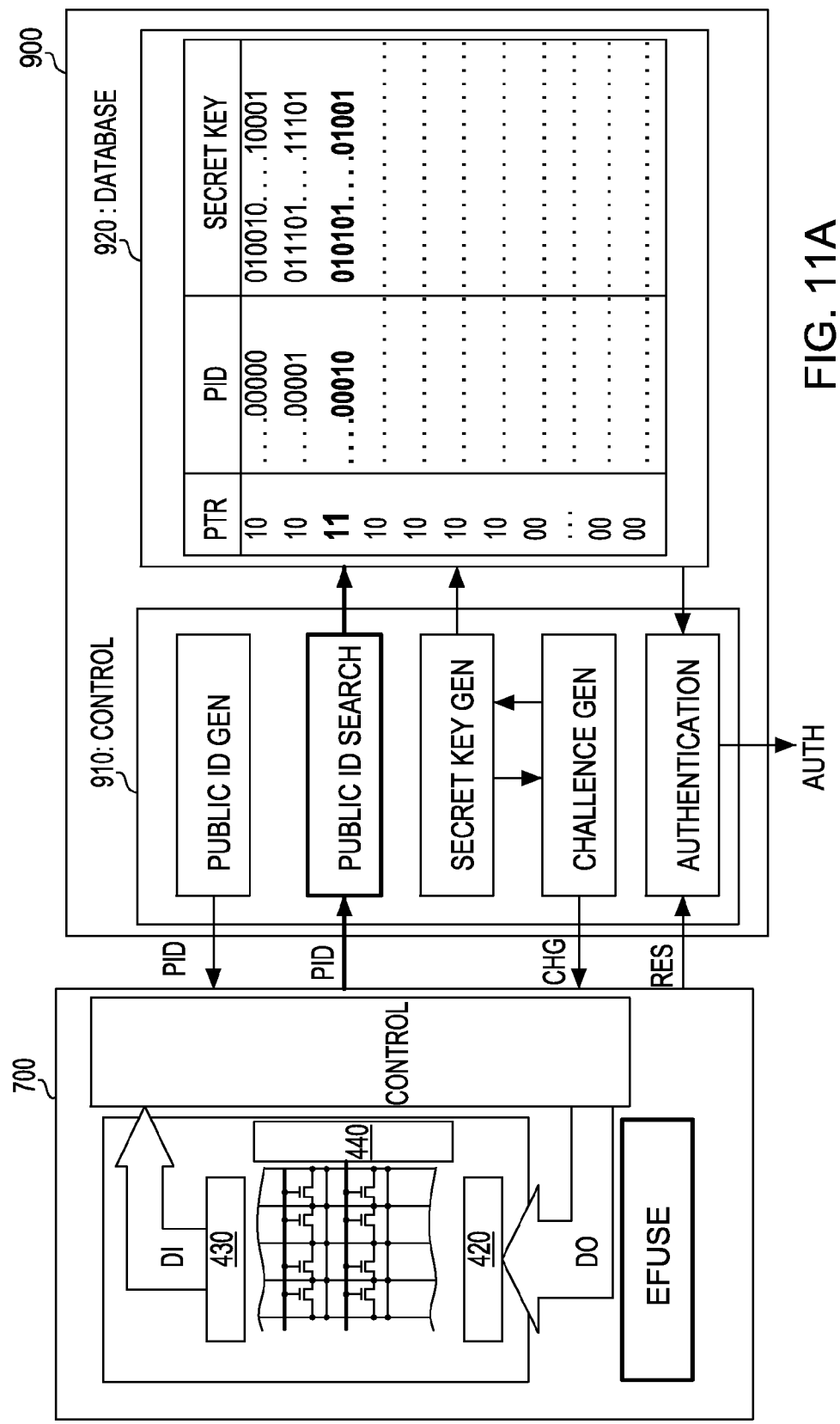
FIG. 11A shows the first and second steps of the authentication process, wherein the public ID is read from the chip by the system and the system search for a matching entry base on the PID.

FIG. 11A shows the authentication steps #1-2, wherein:
Step 1: System (900), makes contact with the chip (700) and started the public ID read request (not shown). As a result public ID (PID) will be read in this case . . . 0010 from the chip (700) to the system (900).
Step 2: The system public ID search block transverses to line #3 of the database and check if the first bit of the PTR section on when entry is a 1. For the present particular case, a 1 is observed, which denoted it is registered.

Figure 11B:
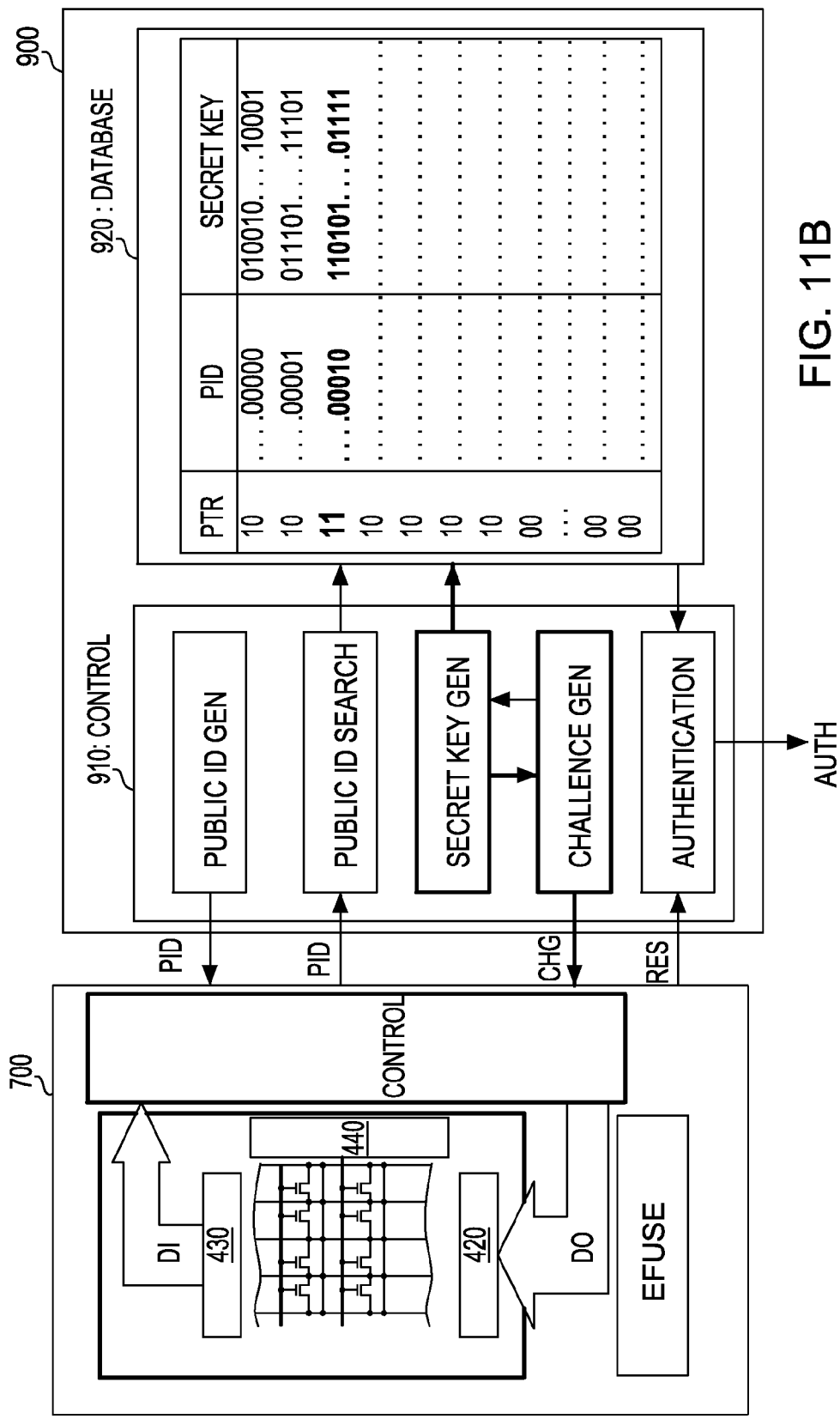
FIG. 11B shows steps 3 to 6 of the authentication process, in which the system generates an ID and converts the ID from the CHG process to the chip. The CHG process is also updated on the secret key section of the system database base on the matching PID entry.

FIG. 11B shows the authentication #3-6, wherein:
Step 3: with the PID found to be registered, the secret key gen block generate a random string and computes an secret key, update the secret key record in the database for entry . . . 01111.
Step 4: Feed the random string to the CHG gen block to generate a string of CHGs to apply to the encryption engine.

Step 5: CHG is effectively a string of ΔDIj (x,y) sent to the chip, overwriting the secret key on the encryption engine. The CHGs ΔDIj (x,y) is also given to the chip. The chip thus overwrites the VT level using the given CHGs ΔDIj (x,y). Step 6: Chip reads the newly achieved VT level form the memory as an encrypted digital output from differential sense amplifier coupled to the twin memory array. The encrypted output DO is then sent to the system as a response (RES).

Figure 11C:
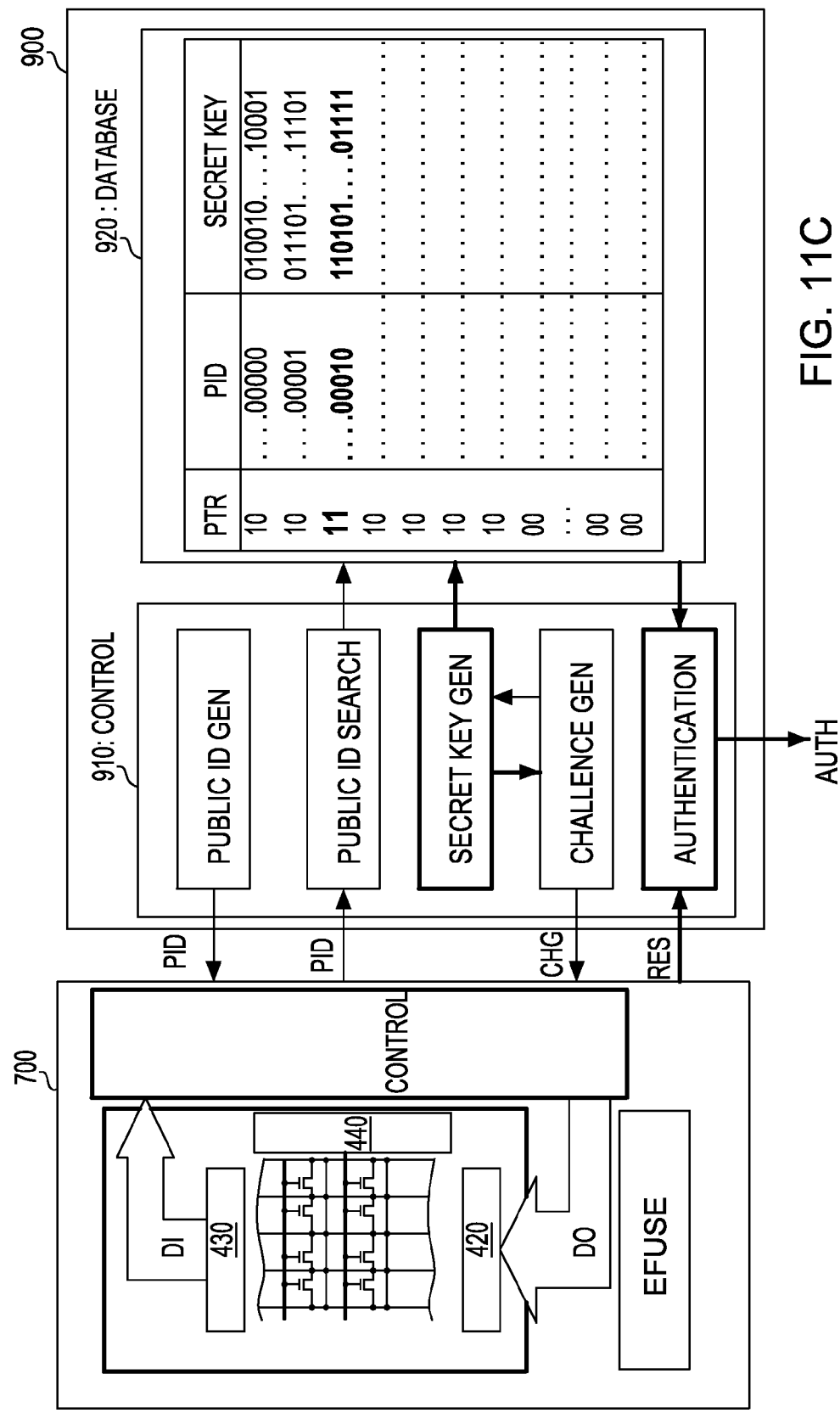
FIG. 11C shows step 7 of the authentication process, in which the chip sends out a response (RES) string to the system. The system then reads out the secret key section of the database, including the matching PID entry and converting it to the expected data output string (DOjs'). The response string is then compared to the expected DOjs' string to determine if the chip pass or fail the authentication process.

FIG. 11C shows the authentication step #7. The chip send out RES string after the CHGs to overwrite the secret key on the encryption engine, the RES string, which is the DOjs of the newly formed secret key, feeds into the authentication block. The authentication block then reads out the secret key section of line #2 from the database which is a string of VT(i,j) and computes for the expected RES string. The expect RES string is then compared with the RES string, the AUTH signal goes to 1 if the two string matches, and goes to 0 if the two did not match.

While the present disclosure has been particularly shown and described with respect to preferred embodiments thereof, it will be understood by those skilled in the art that the foregoing and other changes in forms and details can be made without departing from the spirit and scope of the present disclosure. In one therefore intended that the present disclosure not be limited to the exact forms and details described and illustrated, but fall within the scope of the appended claims.

What is claimed is:

1. A method for creating a hardware encryption engine comprising: using a computer, forming a semiconductor memory comprising a plurality of memory cells, each of said memory cells storing one of at least three levels as an encrypted secret key; and using a sense amplifier to convert said stored one of said at least three levels to a non-recoverable binary bit vector for authentication;
   wherein an initial key of said encrypted secret key is stored in at least one of the plurality of memory cells in a secure environment for registration;
   wherein said at least three levels of said memory cells are overwritten to another one of said at least three levels for subsequent authentication;
   wherein said initial key of said encrypted secret key changes at each of said authentications; and
   wherein said memory is a multi-time-programmable-read- only-memory (MTPROM), with said memory cells storing or overwriting one of said at least three levels by changing a semiconductor device threshold voltage of said memory.

2. The method as recited in claim 1, wherein said semiconductor memory comprises at least one MOS transistor.

3. The method as recited in claim 2, wherein one of said at least three levels is programmed by using a time-dependent-charge-trap MOS characteristics to alter a MOS transistor threshold voltage of said at least one MOS transistor.

4. The method as recited in claim 1 wherein each of said plurality of memory cells uses a twin pair comprising a first and a second NMOS transistor, each twin pair storing the one of at least three levels as the encrypted secret key; wherein each respective level of the at least three levels comprises a corresponding voltage threshold level; and wherein said sense-amplifier converts said stored one of the at least three levels to a binary bit for authentication.

5. An encryption engine comprising:
   a semiconductor memory comprising a plurality of memory cells, each of said memory cells storing one of at least three levels as an encrypted secret key; and a sense-amplifier converting said stored one of said three levels to a non-recoverable binary bit set for authentication;
   wherein an initial of said encrypted secret key is stored in at least one of the plurality of memory cells in a secure environment for registration;
   wherein said at least three levels of said memory cells are overwritten to another one of said at least three levels for subsequent authentication;
   wherein said initial of said encrypted secret key changes at each of said authentications; and
   wherein said memory is a multi-time-programmable-read-only-memory (MTPROM), with said memory cells storing or overwriting one of said at least three levels by changing a semiconductor device threshold voltage of said memory.

6. The encryption engine as recited in claim 5 wherein said semiconductor memory comprises at least one MOS transistor.

7. The encryption engine as recited in claim 6, wherein one of said at least three levels is programmed by using a time-dependent-charge-trap MOS characteristics to alter a MOS transistor threshold voltage of said at least one MOS transistor.

8. The encryption engine as recited in claim 5 wherein each of said plurality of memory cells uses a twin pair comprising a first and a second NMOS transistor, each twin pair storing the one of at least three levels as the encrypted secret key; wherein each respective level of the at least three levels comprises a corresponding voltage threshold level; and wherein said sense-amplifier converts said stored one of at least three levels to a binary bit for authentication.

* * * * *